H. H. HULL.
CLOSURE.
APPLICATION FILED AUG. 20, 1915. RENEWED OCT. 16, 1917.

1,276,223.

Patented Aug. 20, 1918.
2 SHEETS—SHEET 1.

Inventor
Herbert H. Hull
By Hull, Smith, Beck, & West
Attys.

H. H. HULL.
CLOSURE.
APPLICATION FILED AUG. 20, 1915. RENEWED OCT. 16, 1917.

1,276,223.

Patented Aug. 20, 1918.
2 SHEETS—SHEET 2

Inventor
Herbert H. Hull
By Hull, Smith, Brock & West
Attys.

UNITED STATES PATENT OFFICE.

HERBERT H. HULL, OF LAKEWOOD, OHIO, ASSIGNOR, BY MESNE ASSIGNMENTS, TO ANCHOR CAP & CLOSURE CORPORATION, OF BROOKLYN, NEW YORK, A CORPORATION OF NEW YORK.

CLOSURE.

1,276,223.   Specification of Letters Patent.   Patented Aug. 20, 1918.

Application filed August 20, 1915, Serial No. 46,449. Renewed October 16, 1917. Serial No. 196,974.

*To all whom it may concern:*

Be it known that I, HERBERT H. HULL, a citizen of the United States, residing at Lakewood, in the county of Cuyahoga and State of Ohio, have invented a certain new and useful Improvement in Closures, of which the following is a full, clear, and exact description, reference being had to the accompanying drawings.

This invention relates to closures for bottles, jars, or other receptacles, and has for its object the provision of a simple and inexpensive closure which can be applied in a rapid and convenient manner to any receptacle of the proper size, whether cylindrical, tapered, smooth, rough, threaded, or corrugated and without need of having the receptacle specially constructed. Other objects of the invention are the provision of a device of this character which can be manufactured cheaply and expeditiously from inexpensive materials; the provision of a device of this character which will retain the receptacle contents and exclude foreign matters in an efficient manner while permitting easy removal; the provision of a device of this character which must necessarily be destroyed and rendered incapable of succeeding use; the provision of an internal closure that shall be as cheap as cork and more reliable; the provision of a new and improved tool for applying closures to receptacles; while further objects and advantages will appear as the description proceeds.

The essence of my invention consists in this, that a closure having a tapered portion and a packing ring is so distorted as to shift said tapered portion bodily past said packing ring and force said packing ring laterally against the container wall; with or without an additional displacement of the packing by raising up beads or ribs beneath the same.

Figure 1:
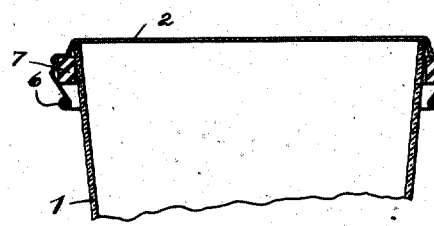
Figure 3:
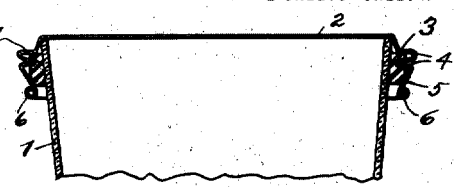
Figure 2:
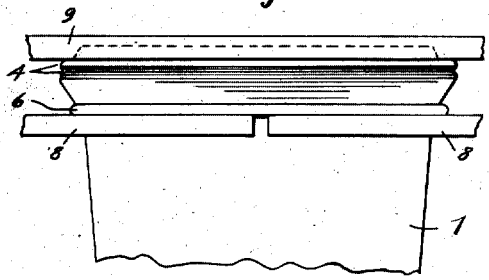
Figure 4:
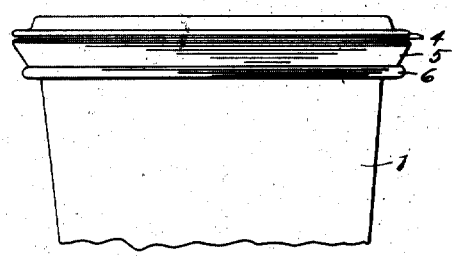
Figure 5:
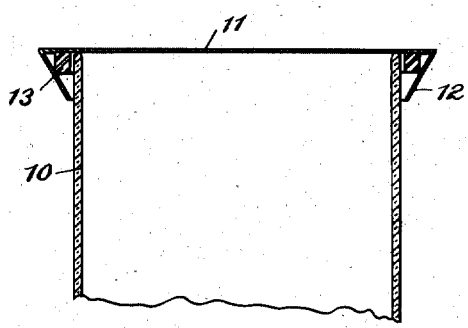
Figure 6:
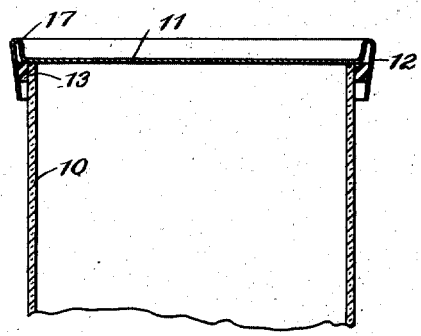
Figure 7:
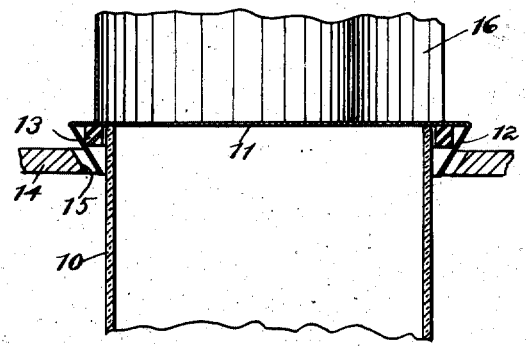
Figure 8:
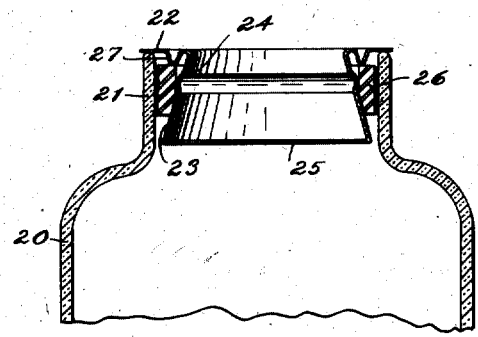
Figure 14:
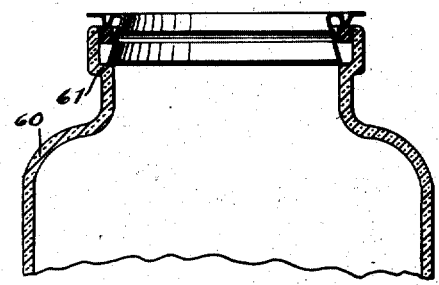
Figure 9:
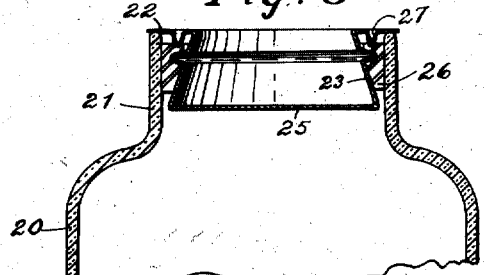
Figure 10:
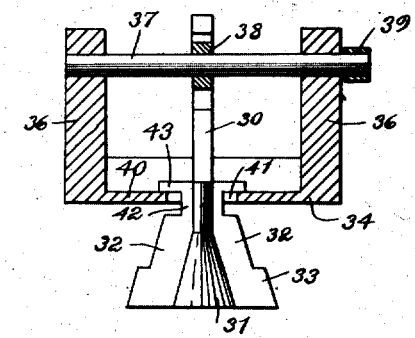
Figure 12:
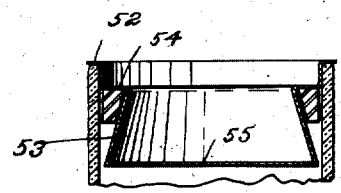
Figure 13:
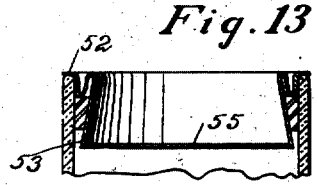

Generally speaking, my invention may be defined as consisting of the combinations and constructions defined in the claims annexed hereto and illustrated in certain embodiments in the drawings accompanying and forming a part of this application wherein: Figure 1 is a vertical, sectional view through the upper part of a flared receptacle, showing a closure of my invention prior to its constriction thereon; Fig. 2 represents a side elevation of the same, together with the means for constricting the cover; Fig. 3 is a view similar to Fig. 1, illustrating the parts in hermetically sealed condition; Fig. 4 represents a side elevation of the parts shown in Fig. 3; Fig. 5 is a vertical sectional view through the upper part of a container of different shape, having a different form of closure applied thereto prior to the securing of same; Fig. 6 is a similar view of the same parts, showing the closure in sealing condition; Fig. 7 illustrates the same parts, together with the means for constricting the closure; Fig. 8 is a vertical, sectional view of the upper part of a third form of container, illustrating a form of closure adapted for application to the interior of the same, but prior to the sealing of the closure; Fig. 9 is a similar view of the same parts after the sealing operation has been effected; Fig. 10 is a vertical, sectional view and Fig. 11 a perspective view of one form of tool whereby such sealing may be effected; Fig. 12 is a vertical, sectional view of still another embodiment of my invention prior to sealing; Fig. 13 illustrates the same after sealing; and Fig. 14 is a vertical, sectional view of still another embodiment of my invention.

Describing the parts by reference characters, first with particular attention to Figs. 1 to 4 inclusive, 1 represents a container which may be of glass or other suitable material such as a jelly tumbler. For employment therewith, I provide a closure made of thin, ductile sheet metal, such as soft steel of thin gage, preferably slightly tinned to prevent corrosion and comprising a flat circular overlying part 2 having at its margin an annular shoulder 3 surrounded by a circular depending flange. This flange comprising a circumferentially beaded portion 4 adjacent to the edge of the shoulder 3 and a frusto-conical inwardly inclined portion 5 immediately below the beaded portion, said inclined portion preferably terminating in the false wire 6. Inside the largest portion of this flange I locate a packing ring 7 of rubber or like material, having a diameter such as normally to permit the ready application of the closure to the receptacle.

For constricting and sealing my closure, I provide a suitable pressing die, which in its simplest form illustrated conventionally in Fig. 2, comprises an embracing part 8, made in two or more sections adapted to surround the receptacle beneath the flange, and a pressing portion 9 adapted to engage the top of the closure. When this die is applied and employed in the manner indicated in Fig. 2, the beaded portion 3 is caused to collapse to the condition illustrated in Figs. 3 and 4, the inclined portion of the flange being thereby shifted relatively to the packing so as to force the packing laterally inward against the wall of the receptacle, whereby a secure and hermetic sealing is accomplished. Movement of the packing at the same time with the flange is prevented by its engagement with the shoulder 3, while the freedom of one side of the packing from inclusion by the metal prevents the imposition of any such pressure thereon as would fracture the receptacle.

The purpose of the shoulder 3 is to prevent movement of the packing ring during the sealing operation and to maintain the same a sufficient distance below the edge of the receptacle to avoid the rounded or irregular portion generally observable in commercial glassware. The sealing action is also assisted by the formation of the rib behind the same which, when it occurs behind the ring, tends to force it toward the glass. If the ring be set below this bead there will be the wedging only; if on a level with it there will be both actions; if above it there will be the rib action only; the selection is a matter of choice as the whole lies within my invention.

Describing next the embodiment illustrated in Figs. 5, 6 and 7, I have illustrated a receptacle 10 having substantially smooth cylindrical walls. To the open mouth of the receptacle, I apply a closure constructed as before, of thin, ductile metal and having a circular overlying portion 11 having at its edge the depending, inwardly tapering frusto-conical flange 12. Inside of the largest part of this flange I locate a packing ring 13 of rubber or like material, the same having an internal diameter sufficient to receive easily the mouth of the receptacle 10. For the purpose of constricting this packing ring and sealing the receptacle, I move the flange bodily past the packing ring so as to bring the narrower portion of the same outside of this ring, whereby the same is pressed against the wall of the receptacle as shown in Fig. 6; to this end I may employ a die 14 having a central aperture 15 whose walls are preferably tapered, but whose smallest diameter is intermediate the smallest and largest diameters of the flange 12. With this die I employ a circular plunger 16 having a diameter greater than that of the receptacle but less than that of the aperture 15. The receptacle 10 together with the closure being first located in the die as shown in Fig. 7, the plunger 16 is depressed, forcing the receptacle and closure through the aperture 15, the walls of which draw the flange 12 inwardly and upwardly to the condition shown in Fig. 6. The packing ring 13 is meanwhile held against movement by reason of its contact with the central portion 11 of the closure, wherefore the movement of the flange therepast exerts an inward sealing pressure thereon. Meanwhile the drawing effect produces a kind of rib or fold 17 between the flat portion 11 and the frusto-conical portion 12. In this embodiment I have shown the free edge of the flange as smooth and unrolled, although the same could be wired if desired. Also it will be understood that the closures shown in the first four views could be employed upon a cylindrical receptacle, or that in the last three views upon a flaring receptacle, or either upon any other kind of receptacle without the necessity of any special construction to coöperate therewith.

Referring next to Figs. 8 and 9, I have illustrated a container 20 such as a bottle having an internally smooth cylindrical neck 21 and with this container I have shown a closure comprising a flat, circular, overlying portion 22 adapted to rest upon the container mouth and having a depending, flaring, frusto-conical portion 23 adapted to enter such mouth. The flaring portion 23 is formed at or near its smallest part where it joins the flat portion 22 with a circumferentially beaded portion 24 while the largest part of said flaring portion is traversed by a flat web 25. Surrounding the portion 23 is a packing ring 26 of rubber or like material, having an internal diameter originally such as to permit the closure to be inserted freely into the receptacle mouth. For the purpose of sealing this closure it is sufficient merely to reduce the height of the closure so as to shift the flaring portion bodily past the packing ring 26 which is thereby wedged laterally into close sealing engagement with the wall of the receptacle. During this deforming operation the portion 22 is preferably held in engagement with the container mouth and the packing ring is preferably maintained stationary at a point somewhat below the top of this mouth through the agency of a suitable rib 27 formed in the overlying portion 22. This maintains the packing ring below the rounding portion frequently occurring in commercial bottles.

Figure 11:
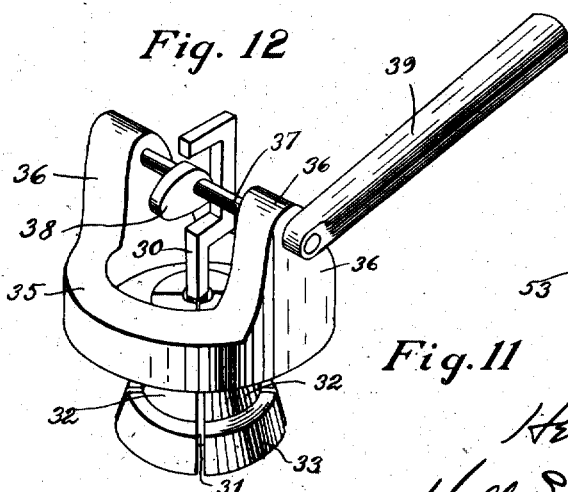

For effecting the constricting action heretofore described, it is necessary to employ some kind of expanding tool which shall grip the depending portion of the closure so as to draw it upward against the overlying portion of the same. One device by which this can be accomplished is illustrated in Figs. 10 and 11 and comprises a vertically movable bolt 30, having at its lower end a tapering head 31, surrounded by a plurality of the frusto-conical gripping members 32, 32, formed at their lower ends with extensions 33, adapted to engage the interior of the closure portion 23, at a point below the bead. The device also possesses a base 34 adapted to rest upon the overlying portion 22 of the closure during the deforming operation. In the embodiment here illustrated this base is provided by a ring 35 which has upon its upper side a pair of spaced brackets 36, 36, in which is journaled a rock shaft 37, provided with a cam 38 adapted to raise and lower the bolt 30 upon the rotation of the shaft by the handle 39. The interior of the ring is also formed with a flat web 40 formed with a central aperture 41, and each of the gripping members 32 is provided with an elongated neck 42 projecting through this aperture and terminating in a flange 43 overlying the edge of the same.

In use this device is lifted by the shaft or ring and placed upon the closure, the collapsed condition of the tool permitting its ready entrance into the interior thereof. Upon rotating the shaft the bolt 30 will next be elevated moving the jaws laterally into engagement with the closure, and afterward drawing these jaws in company with the depending portion of the closure forcibly toward the overlying portion 22, which is meanwhile held down by the ring 35. As soon as sufficient pressure has been produced the shaft is restored to its original position and the tool lifted away. I do not limit myself to the use of this tool in connection with this particular type of closure, as it can be used to good advantage for deforming any kind of interior closure.

In Figs. 12 and 13 I have illustrated still another modification adapted to be operated by the use of a tool of the same or similar nature. In this embodiment the closure is formed with a similar overlying portion 52, a similar tapered portion 53, a shoulder of some kind such as 54 to hold the packing ring below the rounded portion of the bottle mouth, and a web 55, closing the larger end of the tapered portion. With this closure and with a tool of the type shown in Figs. 10 and 11 (but limited in its expansion to a size intermediate the larger and smaller diameters of the portion 53) it is possible to withdraw the tool completely from the closure, drawing the closure to the shape shown in Fig. 13 and wedging the packing tightly against the bottle mouth.

Finally in Fig. 14 I have illustrated an embodiment of my invention wherein there is employed a closure of substantially the same type as in Figs. 8 and 9 but wherein the receptacle 60 is formed inside the mouth with a ledge 61 adapted to engage the extremity of the closure. With this arrangement it will be seen that a downward pressure upon the projecting portion of the closure will collapse the beaded portion in the same manner as before and wedge the packing against the bottle mouth in sealing relation.

It will be noted in all of the above that the sealing action is obtained partly by producing in the rear of the packing a bulge or rib consequent upon the deformation of a bead and partly by the movement past said packing of a tapered member whereby the packing is wedged laterally. The means by which these ends are attained, together with the relative proportion of these operations in the sealing effect is a matter which can be varied widely, wherefore I do not limit myself to such details except as the same may be positively recited in the claims hereto annexed or may be rendered necessary by the prior state of the art.

Having thus described my invention, what I claim is:

1. In a closure for containers, a metallic cap having a portion adapted to overlie the edges of the container mouth and a depending portion inclined toward the container wall adjacent to said mouth, a packing ring adapted to be interposed between said inclined portion and said wall, and across which said depending inclined portion is movable with a wedge action, whereby said packing ring may be pressed laterally against said wall.

2. In a closure for containers, a metallic cap having a portion adapted to overlie the edges of the container mouth and a depending portion inclined toward the container wall adjacent to said mouth, a packing ring adapted to be interposed between said inclined portion and said wall, said inclined portion being movable bodily as a wedge across said packing ring, whereby the same may be pressed laterally against said wall.

3. In a closure for containers, a metallic cap having a flat circular central portion, and a conical wall portion integral with an edge thereof and making an acute angle with the wall of the container, and an annular packing ring lying in said angle, a portion of said cap adjacent to said wall portion being flexible whereby said wall portion may be shifted bodily toward said base portion and relative to said ring and said packing ring wedged laterally.

4. The combination with a container, of a cap having an inclined portion depending beside the wall of the container, and a packing ring between said wall and inclined portion, said inclined portion being movable with a wedge action across the ring to press the same laterally against said wall.

5. A closure for containers, comprising a cap having a part overlying the rim of the container, and an inclined portion depending beside the wall of the container, and a packing ring between said wall and inclined portion, said inclined portion being movable bodily toward said overlying part and across said ring with a wedge action, to press the same laterally against said wall.

6. A closure for containers, comprising a cap having an inclined portion adapted to depend beside the wall of the container and provided with a circumferential bead, and a packing ring adapted to be inserted between said inclined portion and wall, the bead being compressible, thereby permitting movement of said inclined portion with a wedge action across said packing ring to press the same against said wall.

7. A closure for containers, comprising a cap adapted to be applied to the mouth of the container and having an inclined projecting portion adapted to extend opposite the wall of the container, and a packing ring beside said inclined portion and adapted to be confined between the same and said wall of the container, the cap being of thin ductile metal foldable by axial pressure, and the inclined portion being movable with a wedge action across said ring when the cap is so folded, to press the ring against said wall.

8. A closure for containers, comprising a cap adapted to be applied to the mouth of the container and having an inclined portion extending axially and adapted to oppose the side of the container wall, said cap being of thin ductile metal and said inclined portion having a circumferential bead adapted to be collapsed by axial pressure, and a packing ring between said inclined portion and the container wall and across which the said portion is movable with a wedge action when said bead is collapsed.

9. A closure for containers, comprising a circular cap having at one edge thereof, a frusto-conical part projecting axially and adapted to oppose the side of the container wall, and also having a circumferential bead adjacent said edge, said frusto-conical part inclining from said edge at an angle with respect to the container wall, and a packing ring between said frusto-conical part and said wall, said bead being of thin ductile metal whereby it may be collapsed by axial pressure, to move said frusto-conical part across said ring with a wedge action.

10. A closure for receptacles, comprising a cap having a top portion adapted to rest on the rim of the receptacle and an inclined portion depending beside the wall of the receptacle, and a packing ring between said inclined portion and the side wall of the receptacle, said ring abutting against the top portion of the cap to prevent axial shift of the ring, and said inclined portion being shiftable axially with a wedge action across said ring, to press the same against the wall of the container.

11. The combination with a container, of a sealing cap on the rim of the container mouth, having an axially extending flange inclined toward the side wall of the container, a packing ring between said flange and side wall, and an abutment on the cap engaging the outer edge of said ring, said flange being movable axially with a wedge action across said ring.

12. A closure for containers and the like, comprising a cover portion, an inclined wall extending from said cover portion, a gasket ring supported by the inclined wall, means coöperating with said ring when said cap is deformed in the sealing operation to cause a relative upward movement of said inclined wall whereby said ring is compressed between said inclined wall and the smooth side wall of a suitable container.

In testimony whereof, I hereunto affix my signature in the presence of two witnesses.

HERBERT H. HULL.

Witnesses:
HAROLD E. SMITH,
LEROY W. LUFF.